(12) United States Patent
Shemyatovskiy

(10) Patent No.: US 10,968,745 B2
(45) Date of Patent: Apr. 6, 2021

(54) TURBINE, GAS TURBINE, AND METHOD OF DISASSEMBLING TURBINE BLADES

(71) Applicant: DOOSAN HEAVY INDUSTRIES & CONSTRUCTION CO., LTD., Changwon-si (KR)

(72) Inventor: Victor Shemyatovskiy, Changwon-si (KR)

(*) Notice: Subject to any disclaimer, the term of this patent is extended or adjusted under 35 U.S.C. 154(b) by 105 days.

(21) Appl. No.: 16/506,991

(22) Filed: Jul. 9, 2019

(65) Prior Publication Data

US 2020/0056485 A1 Feb. 20, 2020

(30) Foreign Application Priority Data

Aug. 17, 2018 (KR) .................. 10-2018-0096111

(51) Int. Cl.
| | | |
|---|---|---|
| *F01D 5/32* | (2006.01) | |
| *F01D 5/08* | (2006.01) | |
| *F02C 3/06* | (2006.01) | |
| *F01D 5/30* | (2006.01) | |

(52) U.S. Cl.
CPC ........... *F01D 5/085* (2013.01); *F01D 5/3007* (2013.01); *F02C 3/06* (2013.01)

(58) Field of Classification Search
CPC ........ F01D 5/081; F01D 5/085; F01D 5/3015; F05D 2260/31
See application file for complete search history.

(56) References Cited

U.S. PATENT DOCUMENTS

| | | | | |
|---|---|---|---|---|
| 3,644,058 A | * | 2/1972 | Barnabei | ................ F01D 5/326 416/95 |
| 3,853,425 A | | 12/1974 | Scalzo | |
| 5,261,759 A | | 11/1993 | Decoux | |
| 5,662,458 A | | 9/1997 | Owen | |
| 7,465,149 B2 | * | 12/2008 | Dixon | .................... F01D 5/081 415/116 |

(Continued)

FOREIGN PATENT DOCUMENTS

| | | |
|---|---|---|
| JP | 5185426 B2 | 4/2013 |
| KR | 10-1878360 B1 | 7/2018 |

OTHER PUBLICATIONS

A Korean Office Action dated Sep. 27, 2019 in connection with Korean Patent Application No. 10-2018-0096111 which corresponds to the above-referenced U.S. application.

*Primary Examiner* — Ninh H. Nguyen
(74) *Attorney, Agent, or Firm* — Harvest IP Law, LLP

(57) ABSTRACT

A turbine, a gas turbine, and a method of disassembling turbine blades, capable of ensuring stable sealing performance as well as facilitating disassembly of turbine blades are provided. The turbine may include a rotor disk including a plurality of slots formed therein, a plurality of turbine blades spaced apart from each other by a predetermined distance in a circumferential direction of the rotor disk on an outer peripheral surface, each of the turbine blades being inserted into an associated one of the slots, and a retainer sealing a cooling passage defined between the rotor disk and the turbine blade, wherein the turbine blade includes an airfoil-shaped blade part, a root part inserted into the rotor disk, and a platform part located between the blade part and the root part, and the root part includes a blade hook protruding therefrom to support the retainer.

18 Claims, 12 Drawing Sheets

(56) References Cited

U.S. PATENT DOCUMENTS

| | | | |
|---|---|---|---|
| 7,530,791 B2 * | 5/2009 | Douville | F01D 5/3015 |
| | | | 416/220 R |
| 7,566,201 B2 | 7/2009 | Brillert et al. | |
| 2016/0222788 A1 * | 8/2016 | Hough | F01D 5/3007 |

* cited by examiner

US 10,968,745 B2

TURBINE, GAS TURBINE, AND METHOD OF DISASSEMBLING TURBINE BLADES

CROSS-REFERENCE TO RELATED APPLICATION

This application claims priority to Korean Patent Application No. 10-2018-0096111, filed on Aug. 17, 2018, the entire disclosure of which is incorporated herein by reference in its entirety.

BACKGROUND

Field

Apparatuses and methods consistent with exemplary embodiments relate to a turbine, a gas turbine including the same, and a method of disassembling turbine blades.

Description of the Related Art

A gas turbine is a power engine that mixes air compressed in a compressor with fuel for combustion and rotates a turbine using high-temperature gas produced by the combustion. The gas turbine is used to drive a generator, an aircraft, a ship, a train, etc.

This gas turbine includes a compressor, a combustor, and a turbine. The compressor sucks and compresses an outside air, and transmits the compressed air to the combustor. The air compressed in the compressor is in a high-pressure and high-temperature state. The combustor mixes the compressed air introduced from the compressor with fuel and burns a mixture thereof. The combustion gas produced by the combustion is discharged to the turbine. Turbine blades in the turbine are rotated by the combustion gas, thereby generating power. The generated power is used in various fields, such as generating electric power and actuating machines.

Various attempts have been made to improve the efficiency of a gas turbine, and one of them is to reduce a leakage of combustion gas. That is, a gap is formed between an end of a turbine and a housing, resulting in one of the main paths through which combustion gas leaks. Therefore, there is a need for a sealing means to block the leakage.

In order to seal cooling gas flowing from a rotor disk and form a flow path, a retainer is installed adjacent to a lower end of a blade. A conventional retainer is fitted to a side of a blade or a rotor disk or fixed thereto by a fastening member.

However, this conventional method is problematic in that a large number of members are required for assembly and work efficiency is remarkably low due to very complicated assembly and disassembly processes. In particular, this method results in very low work efficiency because of undergoing a complicated process even when one turbine blade needs to be replaced.

SUMMARY

Aspects of one or more exemplary embodiments provide a turbine, a gas turbine, and a method of disassembling turbine blades, capable of ensuring stable sealing performance as well as facilitating disassembly of turbine blades.

Additional aspects will be set forth in part in the description which follows and, in part, will become apparent from the description, or may be learned by practice of the exemplary embodiments.

According to an aspect of an exemplary embodiment, there is provided a turbine including: a rotor disk including a plurality of slots formed therein, a plurality of turbine blades spaced apart from each other by a predetermined distance in a circumferential direction of the rotor disk on an outer peripheral surface, each of the turbine blades being inserted into an associated one of the slots, and a retainer sealing a cooling passage defined between the rotor disk and the turbine blade, wherein the turbine blade includes an airfoil-shaped blade part, a root part inserted into the rotor disk, and a platform part located between the blade part and the root part, and the root part includes a blade hook protruding therefrom to support the retainer.

The root part may include a support protrusion protruding toward a bottom of the slot from a side of the root part coupled with the retainer, and the retainer may be fixed to the support protrusion.

The retainer may include a sealing plate pressed against the root part to seal the cooling passage, a stopper plate covering the sealing plate, and a fixture inserted into the sealing plate and the turbine blade to press the sealing plate against the turbine blade.

The rotor disk may include a lower hook and a disk hook located above the lower hook, the lower hook may be formed to extend, the disk hook may be intermittently formed and inserted between the blade hook of the root part and a blade hook of an adjacent root part, and the stopper plate may be supported by the lower hook, the disk hook, and the blade hook.

The sealing plate may be coupled to each of the turbine blades, and the sealing plate may have a smaller width than the stopper plate.

The stopper plate may be spaced apart from the sealing plate.

The rotor disk may include a support jaw protruding toward the root part from a bottom of the slot at a side of the rotor disk coupled with the retainer.

The support jaw may include a fastening groove into which the fixture is inserted.

The fixture may include a fastening part having a thread on an outer peripheral surface, and a head part coupled to the fastening part to press the sealing plate, and the head part may be installed through the stopper plate.

The fixture may include a fastening part having a thread on an outer peripheral surface, and a head part coupled to the fastening part to press the sealing plate, and the head part may include a flange part protruding therefrom and inserted into a stepped groove formed in the stopper plate.

The lower hook may extend in a circumferential direction of the rotor disk to define a lower channel, the disk hook and the blade hook may define an upper channel, and the lower hook may include a detaching groove for insertion of the retainer.

According to an aspect of another exemplary embodiment, there is provided a gas turbine including: a compressor to compress air, a combustor to mix compressed air compressed by the compressor with fuel for combustion, and a turbine. The turbine may include a rotor disk including a lower hook and a disk hook located above the lower hook, a plurality of turbine blades rotated by combustion gas output from the combustor, each of the turbine blades including an airfoil-shaped blade part, a root part inserted into the rotor disk, and a platform part located between the blade part and the root part and including a blade hook protruding therefrom, and a retainer sealing a cooling passage defined between the turbine blade and the rotor disk and supported by the blade hook, the disk hook, and the lower hook.

The root part may include a support protrusion protruding downward from a side of the root part coupled with the retainer, and the retainer may be fixed to the support protrusion.

The retainer may include a sealing plate sealing the cooling passage, a fixture inserted into the root part to press the sealing plate, and a stopper plate covering the sealing plate and latched by the disk hook, the blade hook, and the lower hook.

The sealing plate may be coupled to each of the turbine blades, the sealing plate may be spaced apart from an adjacent sealing plate, and a side of the stopper plate may be in contact with a side of an adjacent stopper plate.

The rotor disk may include a support jaw protruding toward the root part from a side of the rotor disk coupled with the retainer, and the retainer may be fixed to the support jaw.

The support jaw may include a fastening groove into which the fixture is inserted.

The sealing plate may include a first hole for insertion of the fixture, the stopper plate may include a second hole for insertion of the fixture, and only the first hole from among the first and second holes may have a thread for engagement with the fixture.

According to an aspect of another exemplary embodiment, there is provided a method of disassembling turbine blades of a turbine including a rotor disk including disk hooks and a lower hook located beneath the disk hooks, turbine blades including blade hooks inserted between the disk hooks, and retainers including sealing plates, stopper plates, and fixtures and fixed to the turbine blades, including: separating the fixtures from the turbine blades, the fixtures being kept inserted into the sealing plates and the stopper plates, sliding the retainers between the hooks such that a lower end of the retainer is positioned in a detaching groove formed in the lower hook, removing the retainer of which the lower end is positioned in the detaching groove through the detaching groove to form an opening, sliding the retainers to expose a root part of a turbine blade intended for separation, and separating the turbine blade of which the root part is exposed from the rotor disk.

According to an aspect of another exemplary embodiment, there is provided a method of disassembling turbine blades of a turbine including a rotor disk including disk hooks and a lower hook located beneath the disk hooks, turbine blades including blade hooks inserted between the disk hooks, and retainers including sealing plates, stopper plates, and fixtures and fixed to the turbine blades, including: separating the fixtures from the rotor disk, the fixtures being kept inserted into the sealing plates and the stopper plates, sliding the retainers between the hooks such that a lower end of the retainer is positioned in a detaching groove formed in the lower hook, removing the retainer of which the lower end is positioned in the detaching groove through the detaching groove to form an opening, sliding the retainers to expose a root part of a turbine blade intended for separation, and separating the turbine blade of which the root part is exposed from the rotor disk.

It is to be understood that both the foregoing general description and the following detailed description are exemplary and explanatory and are intended to provide further explanation of the disclosure as claimed.

BRIEF DESCRIPTION OF THE DRAWINGS

The above and other aspects will be more apparent from the following description of the exemplary embodiments with reference to the accompanying drawings, in which.

DESCRIPTION

Figure 1:
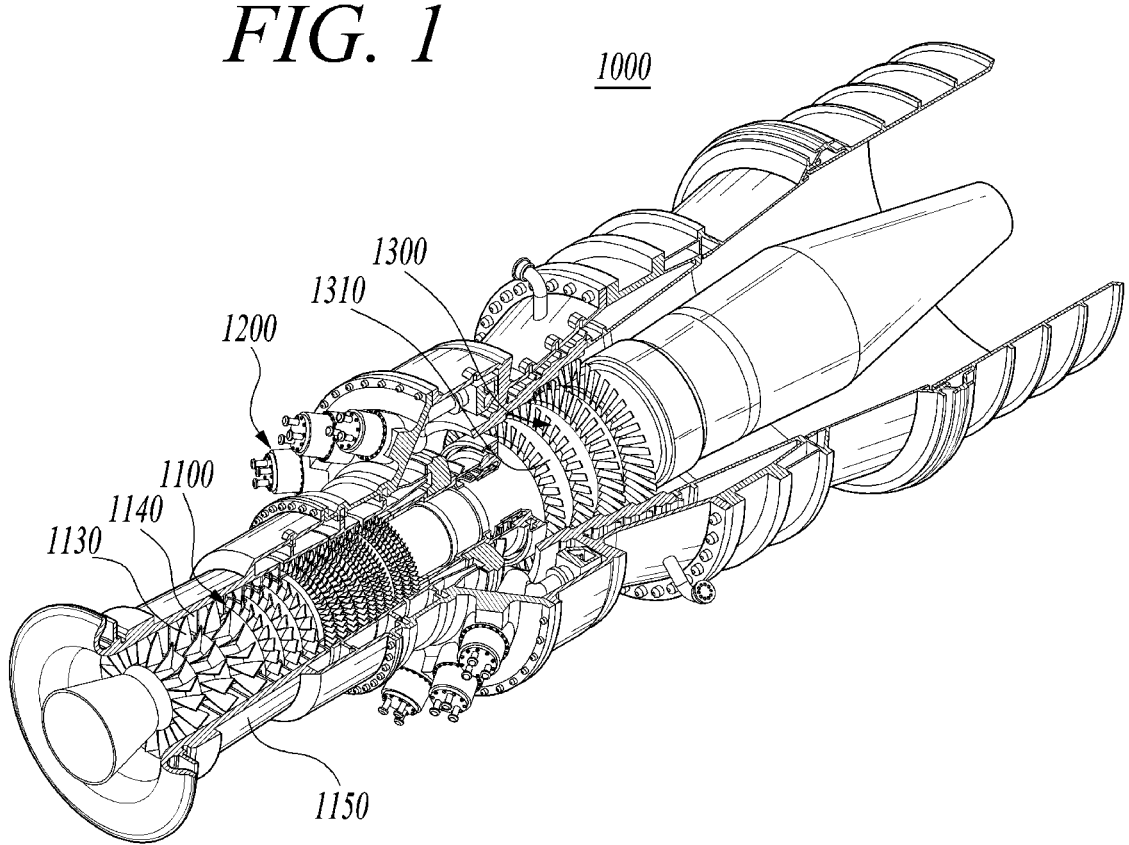
FIG. 1 is a view illustrating an inside of a gas turbine according to an exemplary embodiment.

Various modifications may be made to the embodiments of the disclosure, and there may be various types of embodiments. Specific embodiments are illustrated in the drawings and will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used in the disclosure is for the purpose of describing particular embodiments only and is not intended to limit the scope of the disclosure. As used herein, the singular forms "a", "an" and "the" are intended to include the plural forms as well, unless context clearly indicates otherwise. In this specification, terms such as "comprises/includes" and/or "comprising/including" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Exemplary embodiments will be described below in more detail with reference to the accompanying drawings. In order to clearly illustrate the disclosure in the drawings, some of the elements that are not essential to the complete understanding of the disclosure may be omitted, and like reference numerals refer to like elements throughout the specification.

Hereinafter, a gas turbine according to an exemplary embodiment will be described.

Figure 2:
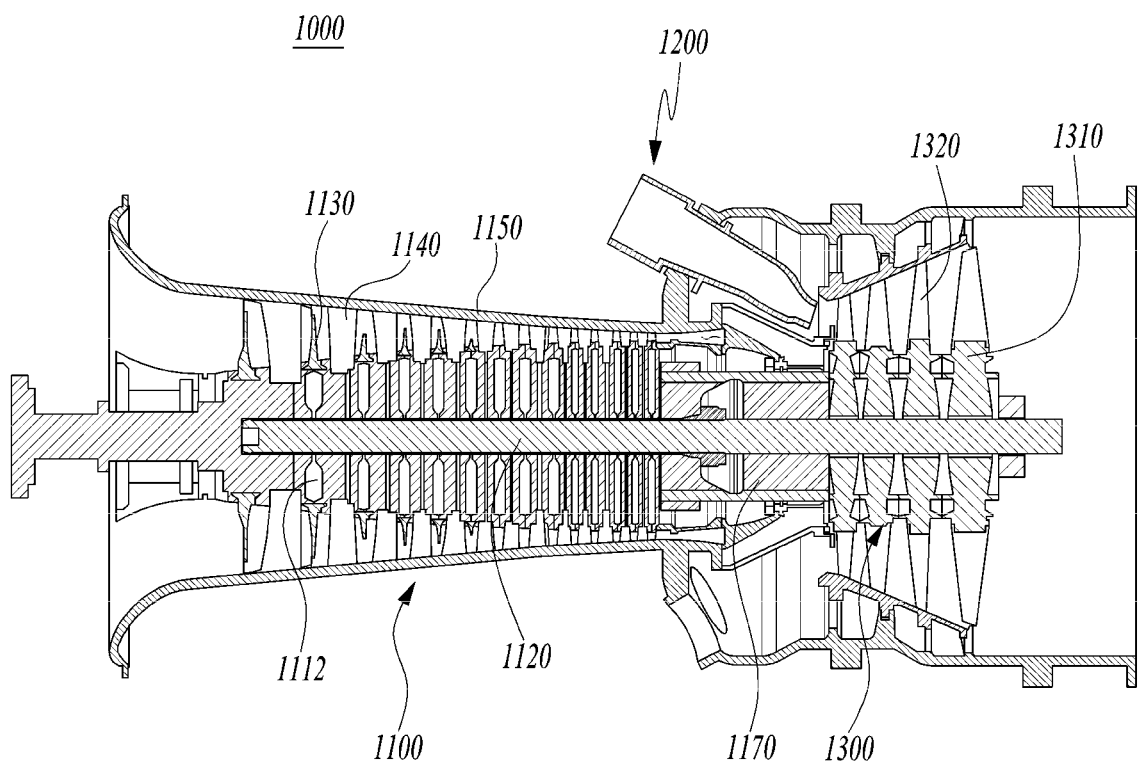
FIG. 2 is a longitudinal sectional view illustrating a portion of the gas turbine of FIG. 1.

FIG. 1 is a view illustrating an inside of a gas turbine according to an exemplary embodiment. FIG. 2 is a longitudinal sectional view illustrating a portion of the gas turbine of FIG. 1.

The thermodynamic cycle of the gas turbine 1000 may ideally follow a Brayton cycle. The Brayton cycle consists of four phases including isentropic compression (i.e., an adiabatic compression), isobaric heat addition, isentropic expansion (i.e., an adiabatic expansion), and isobaric heat dissipation. In other words, in the Brayton cycle, thermal energy may be released by combustion of fuel in an isobaric environment after the atmospheric air is sucked and compressed to a high pressure, hot combustion gas may be expanded to be converted into a kinetic energy, and exhaust gas with residual energy may then be discharged to the atmosphere. The Brayton cycle consists of four processes, i.e., compression, heating, expansion, and exhaust.

The gas turbine 1000 using the above Brayton cycle may include a compressor 1100, a combustor 1200, and a turbine 1300 as illustrated in FIG. 1. Although the following description is given with reference to FIG. 1, the present disclosure may be widely applied to a turbine engine having the same configuration as the gas turbine 1000 illustrated in FIG. 1.

Referring to FIGS. 1 and 2, the compressor 1100 of the gas turbine 1000 may suck and compress air from the outside. The compressor 1100 may supply the air compressed by compressor blades 1130 to the combustor 1200 and supply cooling air to a high-temperature region required for cooling in the gas turbine 1000. Here, because the air sucked into the compressor 1100 is subject to an adiabatic compression process therein, the pressure and temperature of the air passing through the compressor 1100 increase.

The compressor 1100 may be a centrifugal compressor or an axial compressor. The gas turbine 1000 may include a multistage axial compressor 1100 capable of compressing a large amount of air. In the multistage axial compressor 1100, the compressor blades 1130 of the compressor 1100 rotate along with the rotation of a center tie rod 1120 and a rotor disk 1112 to compress air introduced thereinto while moving the compressed air to rear-stage compressor vanes 1140. The air is compressed increasingly to a high pressure while passing through the compressor blades 1130 formed in a multistage manner.

A plurality of compressor vanes 1140 may be formed in a multistage manner and mounted in a housing 1150. The compressor vanes 1140 guide the compressed air moved from front-stage compressor blades 1130 to rear-stage compressor blades 1130. At least a portion of the compressor vanes 1140 may be mounted so as to be rotatable within a fixed range for regulating the inflow rate of air or the like.

The compressor 1100 may be actuated using some of the power output from the turbine 1300. To this end, the rotary shaft of the compressor 1100 may be directly connected to the rotary shaft of the turbine 1300 by a torque tube 1170.

The combustor 1200 may mix the compressed air supplied from the compressor 1100 with fuel for isobaric combustion to produce high-energy combustion gas. The combustor 1200 mixes the compressed air introduced thereinto with fuel and burns a mixture thereof to produce high-temperature and high-pressure combustion gas with high energy. The combustor 1200 increases the temperature of the combustion gas to a temperature at which components of the combustor and the turbine are able to be resistant to heat in the isobaric combustion process.

The combustor 1200 may consist of a plurality of combustors arranged in the form of a cell in the housing, and include a burner having a fuel injection nozzle and the like, a combustor liner defining a combustion chamber, and a transition piece that is a connection between the combustor and the turbine.

The high-temperature and high-pressure combustion gas output from the combustor 1200 is supplied to the turbine 1300. The high-temperature and high-pressure combustion gas supplied to the turbine 1300 applies impingement or reaction force to the turbine blades 1320 of the turbine 1300 while expanding, resulting in a rotational torque. The obtained rotational torque is transmitted via the torque tube 1170 to the compressor 1100, and power exceeding the power required to drive the compressor 1100 is used to drive a generator or the like.

The turbine 1300 includes a plurality of rotor disks 1310, a plurality of turbine blades 1320 radially arranged on each of the rotor disks 1310, and a retainer 1400 for sealing each of the turbine blades 1320. The turbine blade 1320 may be coupled to the rotor disk 1310 in a dovetail manner or the like. In addition, the rotor disk 1310 is provided with vanes fixed to the housing, and the vanes guide the flow direction of combustion gas passing through the turbine blades 1320.

Figure 3:
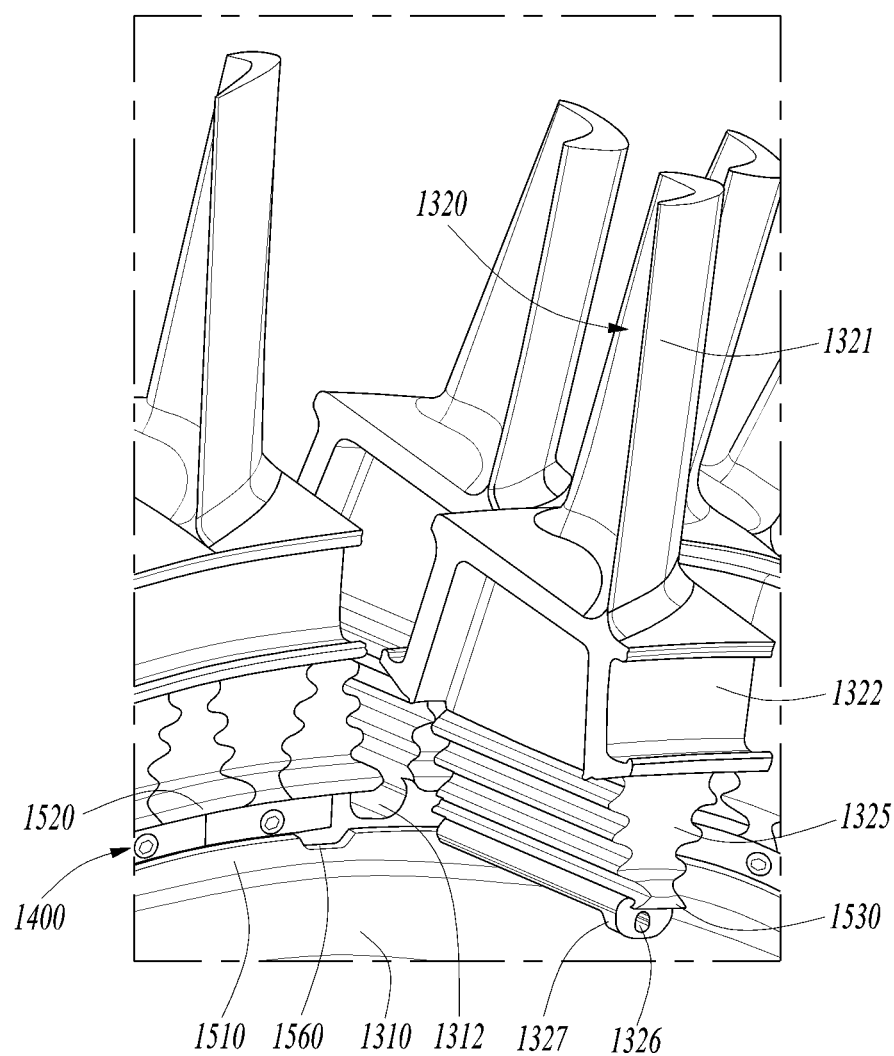
FIG. 3 is a perspective view illustrating a turbine blade and a rotor disk according to an exemplary embodiment.
Figure 4:
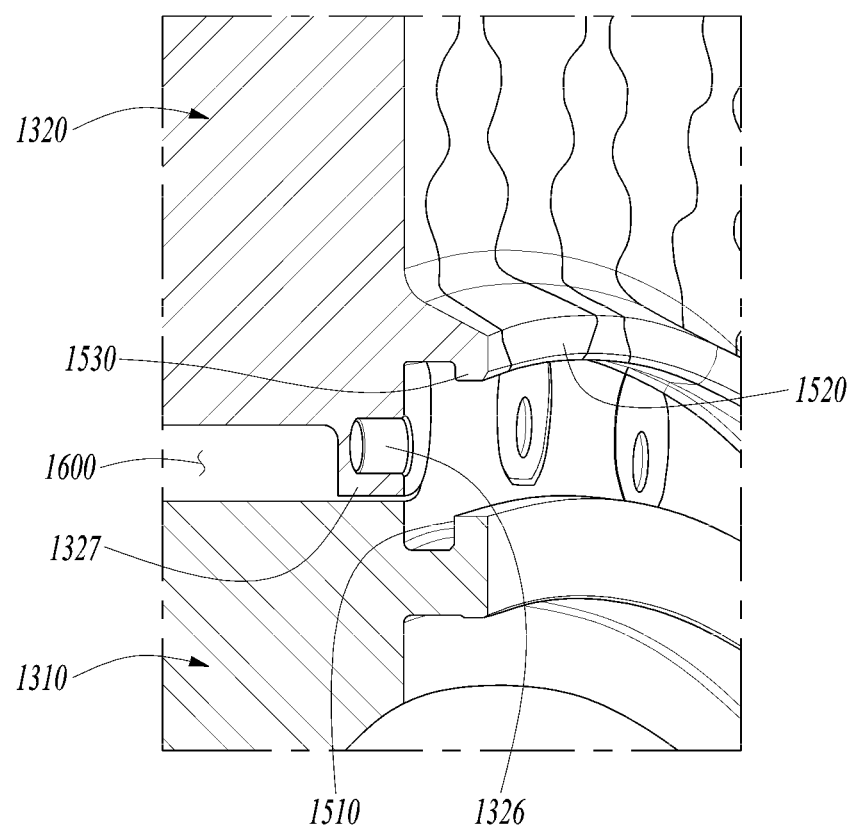
FIG. 4 is a cut perspective view illustrating a state in which the turbine blade and the rotor disk are coupled to each other according to an exemplary embodiment.
Figure 5:
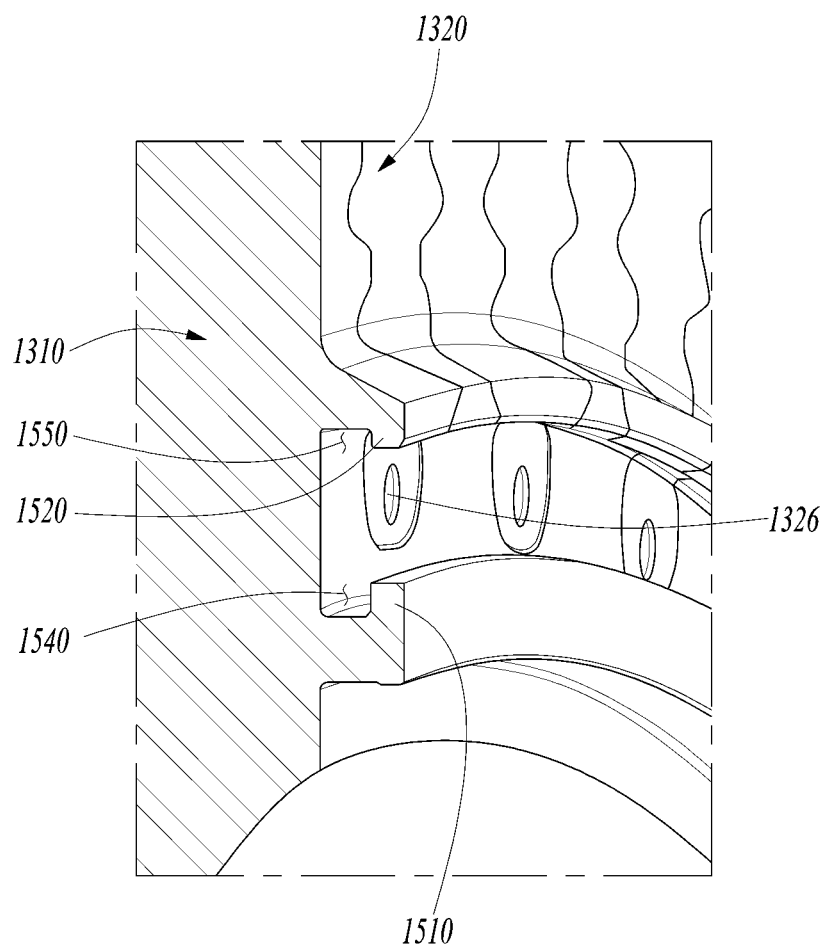
FIG. 5 is a cut perspective view illustrating the rotor disk according to an exemplary embodiment.

FIG. 3 is a perspective view illustrating the turbine blade and the rotor disk according to an exemplary embodiment. FIG. 4 is a cut perspective view illustrating a state in which the turbine blade and the rotor disk are coupled to each other according to an exemplary embodiment. FIG. 5 is a cut perspective view illustrating the rotor disk according to an exemplary embodiment.

Referring to FIGS. 3 to 5, each rotor disk 1310 has a substantially disk shape, and has a plurality of slots 1312 formed on an outer peripheral portion thereof. Each of the slots 1312 has a fir-tree-shaped curved surface and each turbine blade 1320 is inserted into the associated slot 1312.

The turbine blade 1320 includes a plate-shaped blade part 1321, a platform part 1322 coupled (radially inward of the turbine) to a lower portion of the blade part 1321, and a root part 1325 protruding downward from the platform part 1322. The blade part 1321 may be formed of an airfoil-shaped curved plate and may have an airfoil shape optimized according to the specification of the gas turbine 1000.

The blade part 1321 includes a plurality of film cooling holes formed on a surface thereof, and the film cooling holes communicate with a cooling passage 1600 defined in the blade part 1321 to supply cooling air to the surface of the blade part 1321.

The platform part 1322 may be positioned between the blade part 1321 and the root part 1325 and formed of a substantially rectangular plate or a rectangular column shape. The side of the platform part 1322 is in contact with the side of a platform part 1322 of an adjacent turbine blade 1320, thereby serving to maintain a distance between the turbine blades 1320. The cooling passage 1600 may be defined in the blade part 1321, the platform part 1322, and the root part 1325 so that the cooling air from the rotor disk 1310 flows in the cooling passage 1600.

The root part 1325 has a substantially fir-tree-shaped curved portion corresponding to the curved portion formed in the slot 1312 of the rotor disk 1310. Here, the coupling structure of the root part 1325 does not necessarily have a fir-tree form, but may have a dovetail form.

The root part 1325 includes a support protrusion 1327 protruding (radially inward) toward a bottom of the slot 1312. The support protrusion 1327 protrudes inward of the cooling passage 1600 from the side of the root part 1325 coupled with the retainer 1400. The support protrusion 1327 includes a fastening groove 1326 formed for insertion of a fixture 1430. Forming the support protrusion 1327 reduces the width of the gap to be sealed so that stable sealing can be performed with a small component.

The rotor disk 1310 includes a lower hook 1510 and a disk hook 1520 located above the lower hook 1510. The lower hook 1510 is located (radially inward) beneath the slot 1312 and may extend in the circumferential direction of the rotor disk 1310 to have an annular shape. The disk hook 1520 is located (radially outward) above the lower hook 1510 and consists of a plurality of disk hooks intermittently spaced apart from each other and located between the slots 1312.

The lower hook 1510 may have one detaching groove 1560 formed for installation of the retainer 1400. However, the present disclosure is not limited thereto, and a plurality of detaching grooves 1560 may be formed in the lower hook 1510, in which case the number of detaching grooves 1560 is preferably less than half of that of retainers 1400.

The lower hook 1510 protrudes upward to define a lower channel 1540 in which the retainer 1400 is installed between the side of the rotor disk 1310 and the lower hook 1510, and the disk hook 1520 protrudes downward to define an upper channel 1550 in which the retainer 1400 is installed between the side of the rotor disk 1310 and the disk hook 1520.

The turbine blade 1320 includes a blade hook 1530 located above the lower hook 1510 and between the disk hooks 1520.

The blade hook 1530 protrudes downward from the root part 1325, and may define the upper channel 1550 in which the retainer 1400 is inserted between the blade hook 1530 and the side of the turbine blade 1320.

A side of the disk hook 1520 is in contact with a side of the blade hook 1530, and the upper channel 1550 may extend in the circumferential direction of the rotor disk 1310 by the disk hook 1520 and the blade hook 1530. In addition, extending the upper channel 1550 enables the retainer 1400 to slide in the state in which the retainer 1400 is inserted into the upper and lower channels 1550 and 1540.

Figure 6:
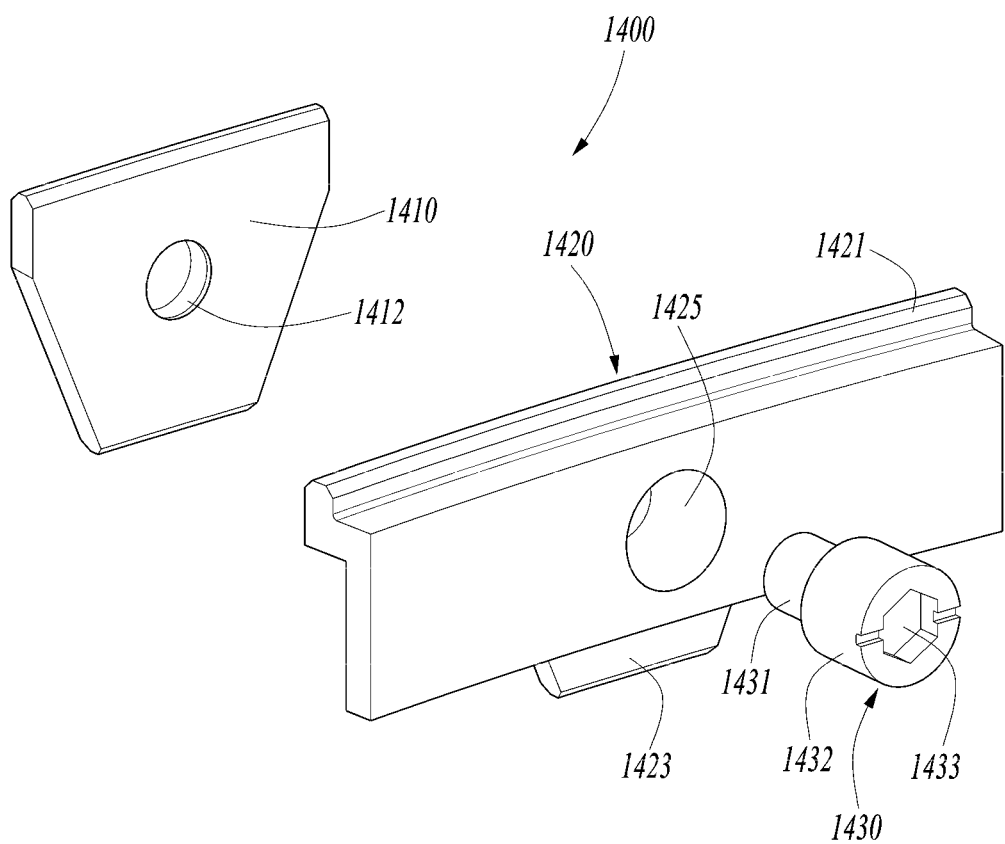
FIG. 6 is an exploded perspective view illustrating a retainer according to an exemplary embodiment.
Figure 7:
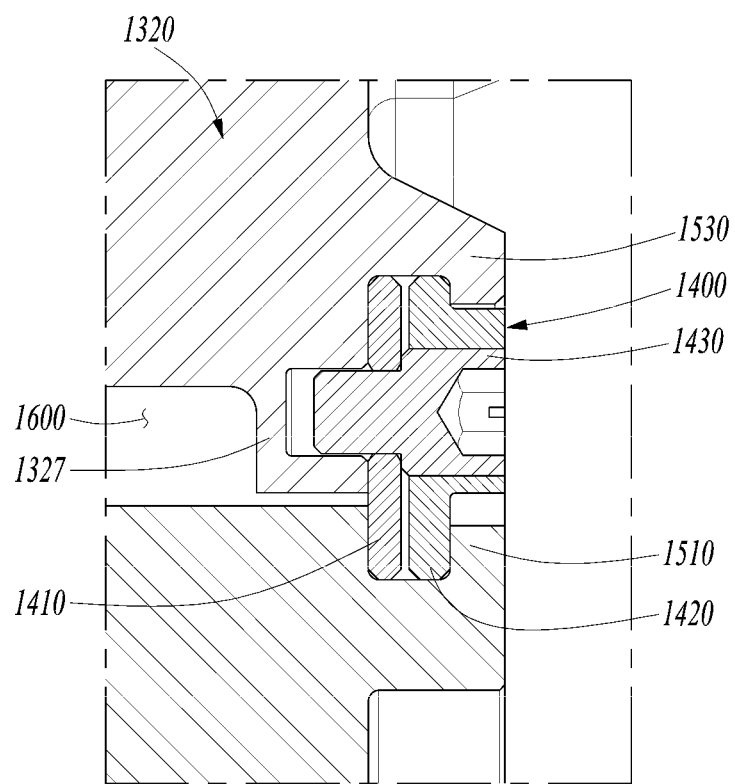
FIG. 7 is a longitudinal sectional view illustrating a state in which the retainer is fixed to the turbine blade and the rotor disk according to an exemplary embodiment.

FIG. 6 is an exploded perspective view illustrating the retainer according to an exemplary embodiment. FIG. 7 is a longitudinal sectional view illustrating a state in which the retainer is fixed to the turbine blade and the rotor disk according to an exemplary embodiment.

Referring to FIGS. 6 and 7, the retainer 1400 includes a sealing plate 1410 fixed to the turbine blade 1320, a stopper plate 1420 covering the sealing plate 1410, and a fixture 1430 pressing the sealing plate 1410 against the turbine blade 1320.

The sealing plate 1410 is formed of a substantially pentagonal plate. The sealing plate 1410 is longer, at an upper end thereof, than a lower end thereof, and has a first hole 1412 formed at a center thereof for insertion of the fixture 1430. The sealing plate 1410 is fixed to the root part 1325 of the turbine blade 1320 to seal the cooling passage 1600 defined between the turbine blade 1320 and the rotor disk 1310.

The stopper plate 1420 is spaced apart from the sealing plate 1410 and disposed to face the sealing plate 1410 in parallel therewith. The stopper plate 1420 includes an upper protrusion 1421 protruding upward and a lower protrusion 1423 protruding downward.

The upper protrusion 1421 may extend along an upper end of the stopper plate 1420 and the lower protrusion 1423 may have the same shape as the lower end of the sealing plate 1410. The upper protrusion 1421 may be supported on the inner surfaces of the disk hook 1520 and the blade hook 1530 and the lower protrusion 1423 may be supported on the inner surface of the lower hook 1510. The stopper plate 1420 has a second hole 1425 formed for insertion of the fixture 1430. The first hole 1412 has a thread formed on the inner surface thereof for engagement with the fixture 1430, and no thread is formed on the inner surface of the second hole 1425.

The fixture 1430 includes a fastening part 1431 having a thread on an outer peripheral surface thereof, and a head part 1432 expanding outward from the fastening part 1431 and having a larger cross-sectional area than the fastening part 1431. The fastening part 1431 has a column shape and may be screwed to the sealing plate 1410 and the turbine blade 1320. The head part 1432 abuts on the sealing plate 1410 to press the sealing plate 1410 against the turbine blade 1320. The head part 1432 has a gripping groove 1433 formed on an upper surface thereof such that a tool such as a wrench or a screwdriver may be inserted thereinto. The head part 1432 is inserted into the stopper plate 1420 but is not screwed thereto. To this end, the second hole 1425 has a larger inner diameter than the first hole 1412.

The fixture 1430 is inserted into the fastening groove 1326 and the first hole 1412 to press the sealing plate 1410, thereby sealing the cooling passage 1600 defined between the turbine blade 1320 and the rotor disk 1310. In this case, because the fixture 1430 is not screwed to the stopper plate 1420, the stopper plate 1420 is spaced apart from the sealing plate 1410 so that a space is defined between the sealing plate 1410 and the stopper plate 1420.

Meanwhile, one retainer 1400 is coupled to one turbine blade 1320 and a width of the sealing plate 1410 is smaller than that of the stopper plate 1420, so that the sealing plates 1410 are spaced apart from each other whereas the sides of the stopper plates 1420 are in contact with each other.

Thus, the sealing plate 1410 can stably seal the cooling passage 1600 defined between the turbine blade 1320 and the rotor disk 1310. In addition, because the stopper plate 1420 is supported by the hooks and sides of the adjacent stopper plates 1420 are in contact with each other, the rotor disk 1310 can be stably supported in the circumferential and axial directions thereof. In addition, because the head part 1432 is inserted into the stopper plate 1420 to cover the protruding portion thereof, it is possible to reduce the wear or failure of the heat part during rotation.

Figure 8:
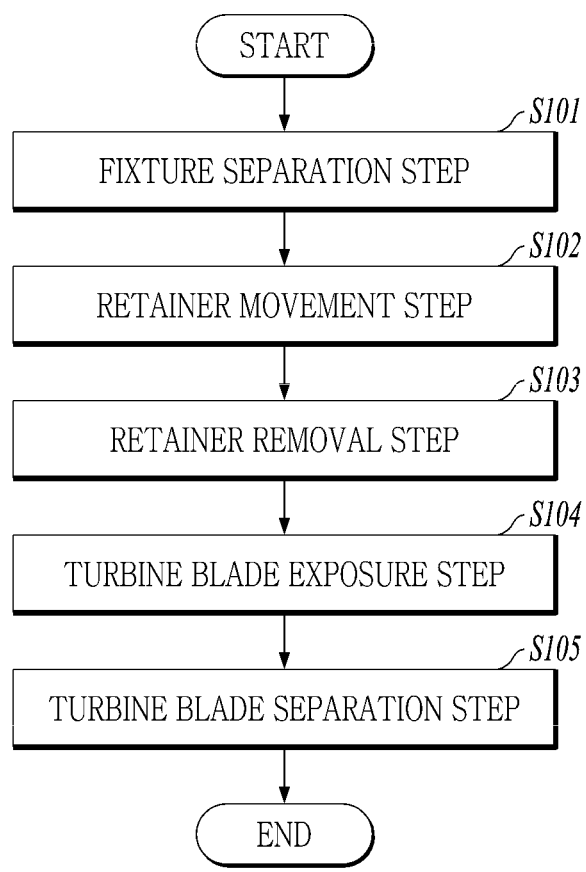
FIG. 8 is a flowchart for explaining a method of disassembling the turbine blade according to an exemplary embodiment.

Hereinafter, a method of disassembling the turbine blade according to an exemplary embodiment will be described. FIG. 8 is a flowchart for explaining the method of disassembling the turbine blade according to an exemplary embodiment.

Referring to FIGS. 3 and 8, the method of disassembling the turbine blade includes a fixture separation step (operation S101), a retainer movement step (operation S102), a retainer removal step (operation S103), a turbine blade exposure step (operation S104), and a turbine blade separation step (operation S105).

In the fixture separation (operation step S101), the fixtures 1430 which fix the sealing plates 1410 and the stopper plates 1420 are separated from the turbine blades 1320. The fixtures 1430 are screwed to the sealing plates 1410 and the turbine blades 1320 through the stopper plates 1420. Accordingly, the fixtures 1430 are unscrewed and separated from the turbine blades 1320, but they are kept inserted into the sealing plates 1410 and the stopper plates 1420. Here, the fixtures 1430 of all of the retainers 1400 installed to the turbine blades 1320 are separated from the turbine blades 1320.

In the retainer movement step (operation S102), the sealing plates 1410 and the stopper plates 1420 supported by the fixtures 1430 are moved by half the width of each of the retainers 1400 in the circumferential direction of the rotor disk 1310 along the upper and lower channels 1550 and 1540 such that the lower end of the retainer 1400 is positioned in the detaching groove 1560. Here, all of the retainers 1400 installed to the rotor disk 1310 slide together.

In the retainer removal step (operation S103), the retainer 1400 of which the lower end is positioned in the detaching groove 1560 is removed through the detaching groove 1560 to form an opening. Here, only one retainer 1400 is separated through the detaching groove 1560. For example, the fixture 1430 is first separated from the sealing plate 1410 and the stopper plate 1420, the stopper plate 1420 is removed from the hook and the sealing plate 1410 is then removed from the hook.

In the turbine blade exposure step (operation S104), the sealing plate 1410 and the stopper plate 1420 supported by the fixture 1430 are moved in the circumferential direction of the rotor disk 1310 along the upper and lower channels 1550 and 1540 such that the opening is positioned in the turbine blade 1320 intended for separation. Removing one retainer 1400 forms an opening, through which the retainers 1400 coupled with the hooks may be moved. Here, the root part 1325 of the turbine blade 1320 intended for separation is exposed through the opening.

In the turbine blade separation step (operation S105), the exposed turbine blade 1320 is separated from the slot of the rotor disk 1310.

On the other hand, in order to mount a new turbine blade 1320, the new turbine blade 1320 is inserted into the slot, and the retainers 1400 are moved and inserted between the hooks with the opening positioned in the detaching groove 1560. In addition, the retainers 1400 are moved by half the width of each of the retainers 1400 so that the holes formed in the fastening groove 1326 and retainers 1400 are positioned on the same axis, in which state the retainer 1400 is coupled to the new turbine blade 1320 with the fixture 1430. As a result, the mounting of the new turbine blade 1320 can be completed.

The rotor disk 1310 may be made of a nickel alloy having a high strength such as Inconel, and it takes much time and cost to form the detaching groove 1560 corresponding to the number of retainers 1400 in the rotor disk 1310 made of a high-strength alloy. However, because the blade hook 1530, the disk hook 1520, and the lower hook 1510 are formed in the exemplary embodiment, the retainer 1400 is easily movable in the circumferential direction of the rotor disk 1310. Therefore, the turbine blade 1320 can be easily separated through one or a few detaching grooves 1560.

Figure 9:
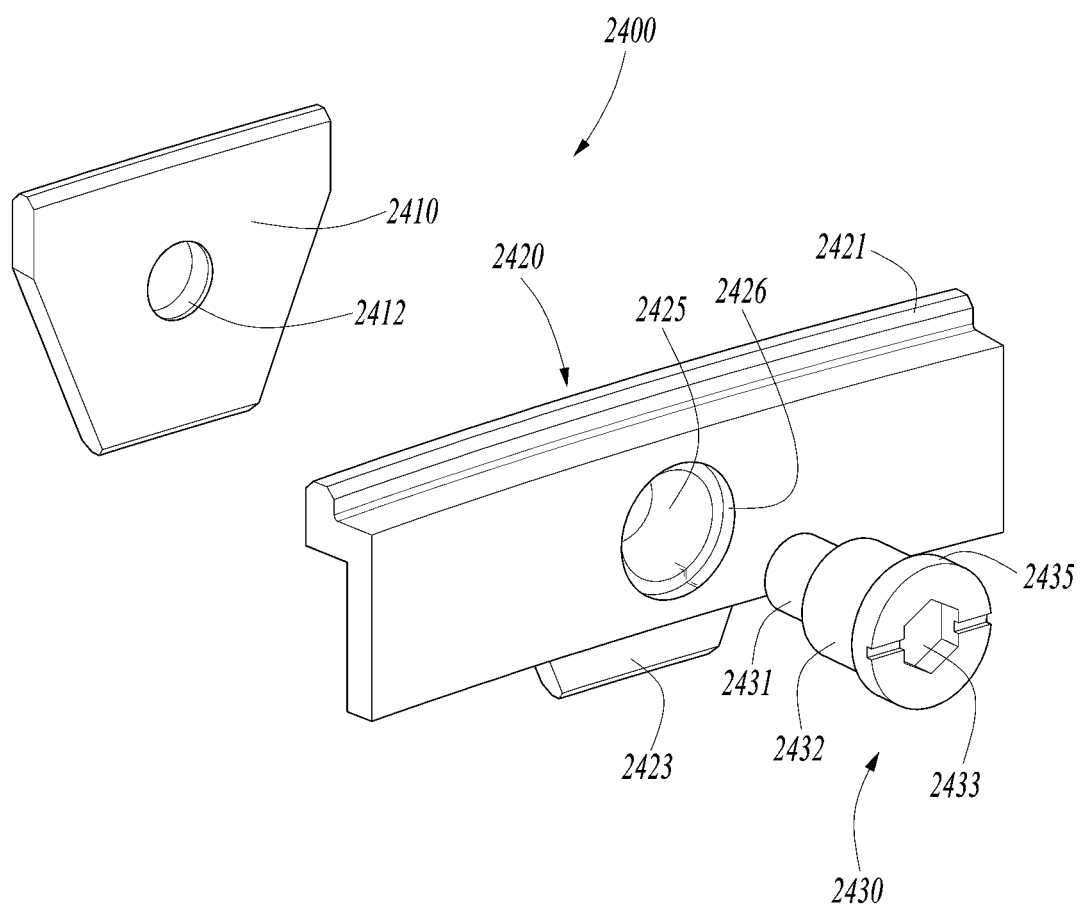
FIG. 9 is an exploded perspective view illustrating a retainer according to another exemplary embodiment.
Figure 10:
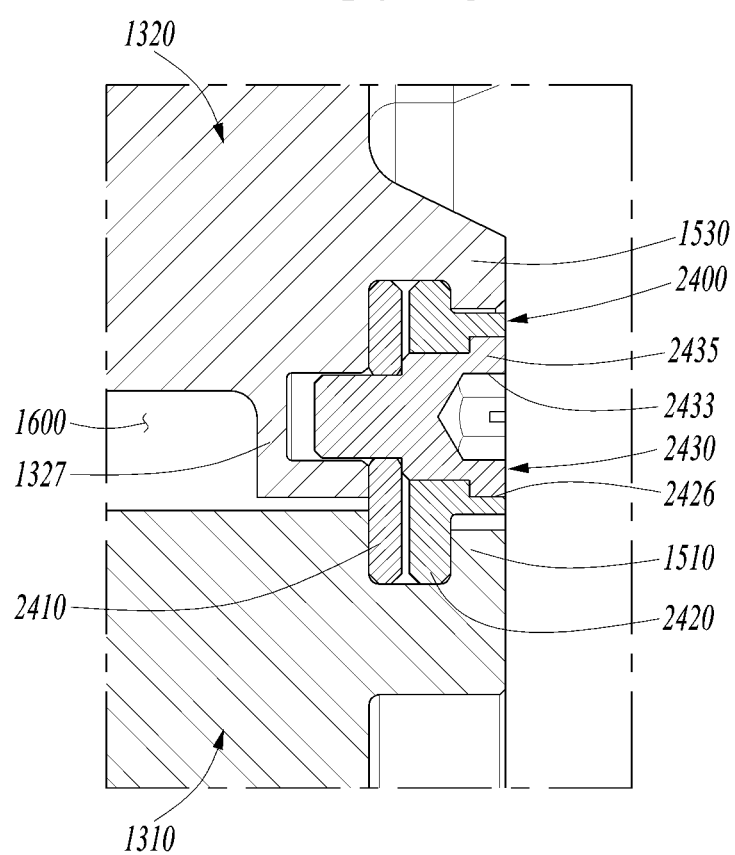
FIG. 10 is a longitudinal sectional view illustrating a state in which the retainer is fixed to a turbine blade and a rotor disk according to another exemplary embodiment.

Hereinafter, a gas turbine according to another exemplary embodiment will be described. FIG. 9 is an exploded perspective view illustrating a retainer according to another exemplary embodiment. FIG. 10 is a longitudinal sectional view illustrating a state in which the retainer is fixed to a turbine blade and a rotor disk according to another exemplary embodiment.

Referring to FIGS. 9 and 10, the retainer 2400 includes a sealing plate 2410 fixed to the turbine blade 1320, a stopper plate 2420 covering the sealing plate 2410, and a fixture 2430 pressing the sealing plate 2410 against the turbine blade 1320.

The sealing plate 2410 is formed of a substantially pentagonal plate. The sealing plate 2410 is longer, at an upper end thereof, than a lower end thereof, and has a first hole 2412 formed for insertion of the fixture 2430. The first hole 2412 of the sealing plate 1410 for insertion of the fixture 2430 has a thread formed on an inner surface thereof.

The sealing plate 2410 is fixed to the root part 1325 of the turbine blade 1320 to seal the cooling passage 1600 defined between the turbine blade 1320 and the rotor disk 1310.

The stopper plate 2420 is spaced apart from the sealing plate 2410 and disposed to face the sealing plate 2410 in parallel therewith. The stopper plate 2420 includes an upper protrusion 2421 protruding upward and a lower protrusion 2423 protruding downward.

The upper protrusion 2421 may be supported on the inner surfaces of the disk hook 1520 and the blade hook 1530 and the lower protrusion 2423 may be supported on the inner surface of the lower hook 1510. The stopper plate 2420 has a second hole 2425 formed for insertion of the fixture 2430. The first hole 2412 has a thread formed on an inner surface thereof, and no thread is formed on an inner surface of the second hole 2425. The stopper plate 2420 has a stepped groove 2426 on an outer surface thereof. The stepped groove 2426 is connected to the second hole 2425 and extends along the circumference of the second hole 2425. The stepped groove 2426 has an expanded structure outward from the second hole 2425.

The fixture 2430 includes a fastening part 2431 having a thread on an outer peripheral surface thereof, and a head part 2432 expanding outward from the fastening part 2431 and having a larger cross-sectional area than the fastening part 2431. The fastening part 2431 has a column shape and may be screwed to the sealing plate 2410 and the turbine blade 1320.

The head part 2432 abuts on the sealing plate 2410 to press the sealing plate 2410 against the turbine blade 1320. The head part 2432 includes a flange part 2435 protruding laterally and inserted into the stepped groove 2426. The flange part 2435 has an annular shape extending in the circumferential direction of the head part 2432 and is inserted into the stepped groove 2426 to support the stopper plate 2420. The head part 2432 has a gripping groove 2433 formed on an upper surface thereof such that a tool such as a wrench or a screwdriver may be inserted thereinto. The head part 2432 is inserted into the stopper plate 2420 but is not screwed thereto.

The fixture 2430 is inserted into the fastening groove 1326 and the first hole 2412 to press the sealing plate 2410, thereby sealing the cooling passage 1600 defined between the turbine blade 1320 and the rotor disk 1310. In this case, because the fixture 2430 is not screwed to the stopper plate 2420, the stopper plate 2420 is spaced apart from the sealing plate 2410 so that a space is defined between the sealing plate 2410 and the stopper plate 2420.

By forming the flange part 2435 in the fixture 2430, the stopper plate 2420 can be stably supported by the flange part 2435 as well as supported by the blade hook 1530, the disk hook 1520, and the lower hook 1510.

Figure 11:
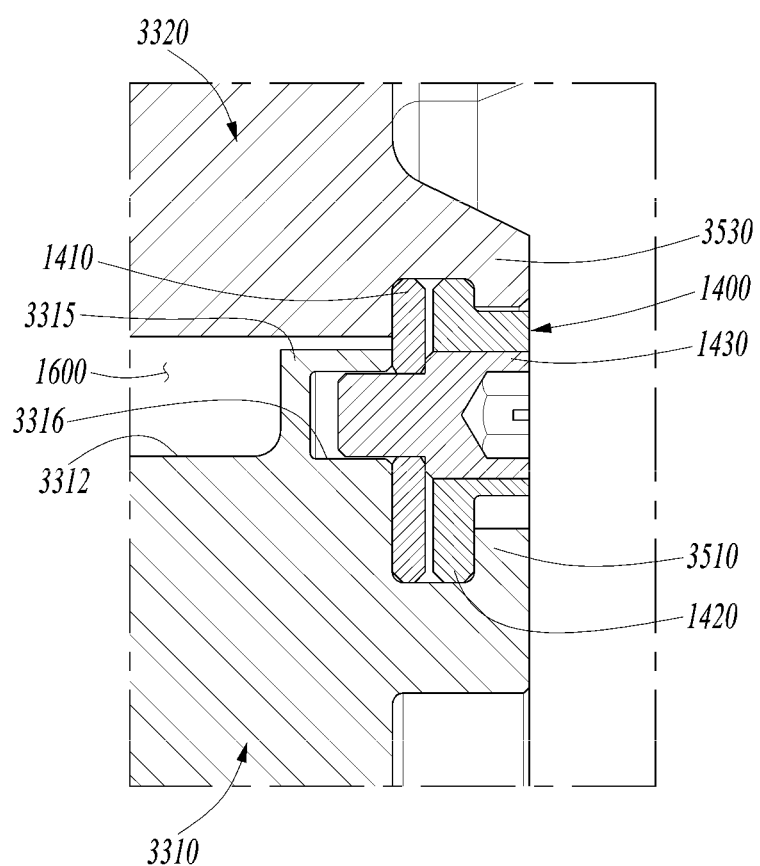
FIG. 11 is a longitudinal sectional view illustrating a state in which a retainer is fixed to a turbine blade and a rotor disk according to another exemplary embodiment.

Hereinafter, a gas turbine according to another exemplary embodiment will be described. FIG. 11 is a longitudinal sectional view illustrating a state in which a retainer is fixed to a turbine blade and a rotor disk according to another exemplary embodiment.

Referring to FIG. 11, the rotor disk 3310 includes a support jaw 3315 protruding toward the root part 1325. The support jaw 3315 protrudes toward the root part 1325 of the turbine blade 3320 from a bottom of the slot 3312 at the side of the rotor disk 3310 coupled with the retainer 1400. The rotor disk 3310 includes a lower hook 3510 and a disk hook, and the turbine blade 3320 includes a blade hook 3530.

The support jaw 3315 has a fastening groove 3316 into which the fixture 1430 is inserted. If no support protrusion and fastening groove are formed in the turbine blade 3320, the retainer 1400 is coupled only to the rotor disk 3310.

Forming the support jaw 3315 reduces the width of the gap to be sealed so that stable sealing can be performed with a small component.

Figure 12:
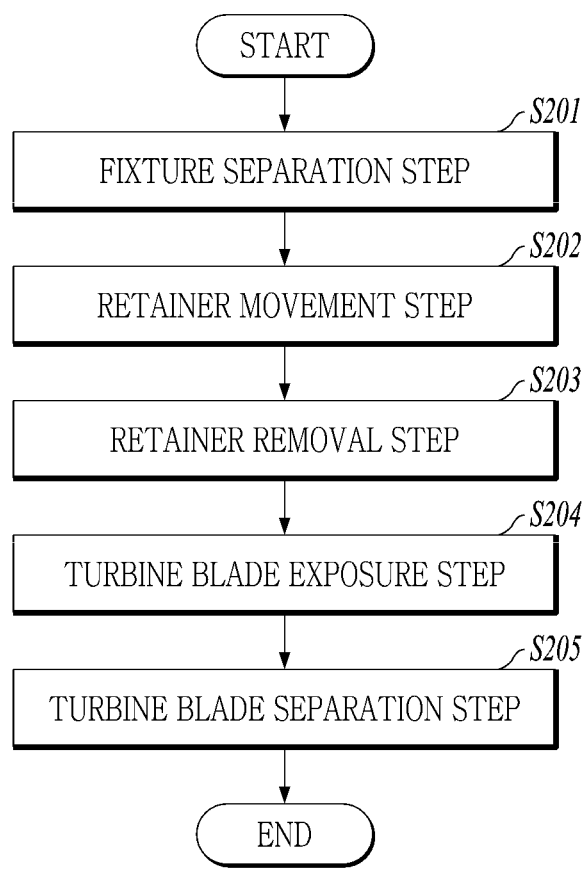
FIG. 12 a flowchart for explaining a method of disassembling the turbine blade according to another exemplary embodiment.

Hereinafter, a method of disassembling the turbine blade according to another exemplary embodiment will be described. FIG. 12 is a flowchart for explaining the method of disassembling the turbine blade according to another exemplary embodiment.

Referring to FIGS. 11 and 12, the method of disassembling the turbine blade includes a fixture separation step (operation S201), a retainer movement step (operation S202), a retainer removal step (operation S203), a turbine blade exposure step (operation S204), and a turbine blade separation step (operation S205).

In the fixture separation step (operation S201), the fixtures 1430 which fix the sealing plates 1410 and the stopper plates 1420 are separated from the rotor disk 3310. The fixtures 1430 are screwed to the sealing plates 1410 and the rotor disk 3310 through the stopper plates 1420. Accordingly, the fixtures 1430 are unscrewed and separated from the rotor disks 3310, but they are kept inserted into the sealing plates 1410 and the stopper plates 1420. Here, the fixtures 1430 of all retainers 1400 installed to the rotor disk 3310 are separated from the rotor disk 3310.

In the retainer movement step (operation S202), the sealing plates 1410 and the stopper plates 1420 supported by the fixtures 1430 are moved by half the width of each of the retainer 1400 in the circumferential direction of the rotor disk 3310 such that the lower end of the retainer 1400 is positioned in the detaching groove. Here, all of the retainers 1400 installed to the rotor disk 3310 slide together.

In the retainer removal step (retainer 1400 S203), the retainer 1400 of which the lower end is positioned in the detaching groove is removed through the detaching groove to form an opening. Here, only one retainer 1400 is separated through the detaching groove 1560.

In the turbine blade exposure step (retainer 1400 S204), the sealing plates 1410 and the stopper plates 1420 supported by the fixtures 1430 are moved in the circumferential direction of the rotor disk 3310 such that the opening is positioned in the turbine blade 3320 intended for separation. Here, the root part of the turbine blade 3320 intended for separation is thus exposed through the opening.

In the turbine blade separation step (retainer 1400 S205), the exposed turbine blade 3320 is separated from the slot of the rotor disk 3310.

On the other hand, in order to mount a new turbine blade 3320, the new turbine blade 3320 is inserted into the slot 3312, and the retainers 1400 are moved and inserted between the hooks with the opening positioned in the detaching groove. In addition, the retainers 1400 are moved by half the width of each of the retainers so that the holes formed in the fastening groove 3316 and retainers 1400 are positioned on the same axis, in which state the retainer 1400 is coupled to the rotor disk 3310 with the fixture 1430. As a result, the mounting of the new turbine blade 3320 can be completed.

As is apparent from the above description, in accordance with the turbine and the gas turbine according to the exemplary embodiments, because the blade hook supporting the retainer is formed on the root part of the turbine blade, it is possible to easily separate the turbine blade as well as to stably install the retainer.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A turbine comprising:
a rotor disk including a plurality of slots formed therein;
a plurality of turbine blades spaced apart from each other by a predetermined distance in a circumferential direction of the rotor disk on an outer peripheral surface, each of the turbine blades being inserted into an associated one of the slots; and
a retainer sealing a cooling passage defined between the rotor disk and the turbine blade,
wherein the turbine blade comprises an airfoil-shaped blade part, a root part inserted into the rotor disk, and a platform part located between the blade part and the root part, and the root part includes a blade hook protruding therefrom to support the retainer, and
wherein the root part includes a support protrusion protruding toward a bottom of the slot from a side of the root part coupled with the retainer, and the retainer is fixed to the support protrusion.

2. The turbine according to claim 1, wherein the retainer comprises a sealing plate pressed against the root part to seal the cooling passage, a stopper plate covering the sealing plate, and a fixture inserted into the sealing plate and the turbine blade to press the sealing plate against the turbine blade.

3. The turbine according to claim 2, wherein
the rotor disk comprises a lower hook and a disk hook located above the lower hook,
the disk hook is intermittently formed and inserted between the blade hook of the root part and a blade hook of an adjacent root part, and the stopper plate is supported by the lower hook, the disk hook, and the blade hook.

4. The turbine according to claim 3, wherein
the sealing plate is coupled to each of the turbine blades, and
the sealing plate has a smaller width than the stopper plate.

5. The turbine according to claim 3, wherein the stopper plate is spaced apart from the sealing plate.

6. The turbine according to claim 3, wherein the rotor disk includes a support jaw protruding toward the root part from a bottom of the slot at a side of the rotor disk coupled with the retainer.

7. The turbine according to claim 6, wherein the support jaw includes a fastening groove into which the fixture is inserted.

8. The turbine according to claim 3, wherein the fixture comprises a fastening part having a thread on an outer peripheral surface, and a head part coupled to the fastening part to press the sealing plate, and the head part is installed through the stopper plate.

9. The turbine according to claim 3, wherein the fixture comprises a fastening part having a thread on an outer peripheral surf ace, and a head part coupled to the fastening part to press the sealing plate, and the head pair includes a flange part protruding therefrom and inserted into a stepped groove formed in the stopper plate.

10. The turbine according to claim 3, wherein
the lower hook extends in a circumferential direction of the rotor disk to define a lower channel,
the disk hook and the blade hook define an upper channel, and
the lower hook includes a detaching groove for insertion of the retainer.

11. A gas turbine comprising:
a compressor configured to compress air;
a combustor configured to mix compressed air compressed by the compressor with fuel for combustion; and
a turbine,
wherein the turbine comprises:
a rotor disk including a lower hook and a disk hook located above the lower hook;
a plurality of turbine blades rotated by combustion gas output from the combustor, each of the turbine blades comprising an airfoil-shaped blade part, a root part inserted into the rotor disk, and a platform part located between the blade part and the root part and including a blade hook protruding therefrom; and
a retainer sealing a cooling passage defined between the turbine blade and the rotor disk and supported by the blade hook, the disk hook, and the lower hook.

12. The gas turbine according to claim 11, wherein the root part includes a support protrusion protruding downward from a side of the root part coupled with the retainer, and the retainer is fixed to the support protrusion.

13. The gas turbine according to claim 11, wherein the retainer comprises a sealing plate sealing the cooling passage, a fixture inserted into the root part to press the sealing plate, and a stopper plate covering the sealing plate and latched by the disk hook, the blade hook, and the lower hook.

14. The gas turbine according to claim 13, wherein
the sealing plate is coupled to each of the turbine blades, and
the sealing plate is spaced apart from an adjacent sealing plate, and a side of the stopper plate is in contact with a side of an adjacent stopper plate.

15. The gas turbine according to claim 13, wherein the rotor disk includes a support jaw protruding toward the root part from a side of the rotor disk coupled with the retainer, and the retainer is fixed to the support jaw.

16. The gas turbine according to claim 15, wherein the support jaw includes a fastening groove into which the fixture is inserted.

17. The gas turbine according to claim 13, wherein the sealing plate includes a first hole for insertion of the fixture, the stopper plate includes a second hole for insertion of the fixture, and only the first hole from among the first and second holes has a thread for engagement with the fixture.

18. A method of disassembling turbine blades of a turbine comprising a rotor disk including disk hooks and a lower hook located beneath the disk hooks, turbine blades including blade hooks inserted between the disk hooks, and retainers including sealing plates, stopper plates, and fixtures and fixed to the turbine blades, the method comprising:
separating the fixtures from the turbine blades or the rotor disk, the fixtures being kept inserted into the sealing plates and the stopper plates;
sliding the retainers between the hooks such that a lower end of the retainer is positioned in a detaching groove formed in the lower hook;
removing the retainer of which the lower end is positioned in the detaching groove through the detaching groove to form an opening;
sliding the retainers to expose a root part of a turbine blade intended for separation; and
separating the turbine blade of which the root part is exposed from the rotor disk.

* * * * *